(12) United States Patent
Owari

(10) Patent No.: US 6,934,889 B2
(45) Date of Patent: Aug. 23, 2005

(54) DEVICE WITH AUTOMATIC HELP FUNCTION

(75) Inventor: Atsushi Owari, Tokyo (JP)

(73) Assignee: Oki Data Corporation, Tokyo (JP)

(*) Notice: Subject to any disclaimer, the term of this patent is extended or adjusted under 35 U.S.C. 154(b) by 564 days.

(21) Appl. No.: 10/080,117

(22) Filed: Feb. 21, 2002

(65) Prior Publication Data
US 2002/0144192 A1 Oct. 3, 2002

(30) Foreign Application Priority Data
Feb. 23, 2001 (JP) .................................. 2001-048429

(51) Int. Cl.$^7$ .............................................. G06F 11/00
(52) U.S. Cl. .................................. 714/46; 714/57
(58) Field of Search .................. 714/46, 57; 345/708, 345/714, 713; 399/18

(56) References Cited

U.S. PATENT DOCUMENTS 4,609,919 A * 9/1986 Miyazaki et al. ............ 345/56
6,782,345 B1 * 8/2004 Siegel et al. ................. 702/183
2003/0058266 A1 * 3/2003 Dunlap et al. ............... 345/705

FOREIGN PATENT DOCUMENTS

EP        565 761 A1 * 10/1993 .......... G03G/15/00

* cited by examiner

*Primary Examiner*—Bryce P. Bonzo
(74) *Attorney, Agent, or Firm*—Akin Gump Strauss Hauer & Feld, LLP

(57) ABSTRACT

A device that carries out a variety of functions or services according to various settings has a memory storing help lists explaining what settings are necessary for each service or function. Another memory stores the addresses of these help lists. When a function or service fails to operate correctly, a reference unit uses information related to unexecuted operations in the function or service to find the address of the applicable help list, which can then be displayed or printed for the user to see. The user may also be prompted to check and modify the related settings. When something goes wrong, this help function enables the user to find the cause of the problem quickly and make setting changes that will solve the problem.

19 Claims, 15 Drawing Sheets

| FUNCTION/ SERVICE/ ERROR CODE | OPERATION TRANSITIONS | SETTING NUMBERS | HELP LIST ADDRESS |
|---|---|---|---|
| TRANSMIT | [TEN, OT, AD], START | Y5, Y7, Y9, Y5, Y9, D5, D10, S12, S13, S38, S39 | *6010 |
| ⋮ | ⋮ | ⋮ | ⋮ |
| PRESCHEDULED TRANSMIT | FUNC, OT1, YES, TEN, YES, [TEN, OT, AD], START | Y5, Y7, Y9, Y5, Y9, D5, D10, S12, S13, S38, S39 | *6050 |
| 1234 (PAPER SIZE ERROR) | | Y13 | *7030 |
| BA01(ISDN) | | Y30, Y31, S3, S40, S41, S42, S43 | *7100 |

| USER SETTINGS (Y) | | DIAL OPTIONS (D) | | SERVICEMAN SETTINGS (S) | |
|---|---|---|---|---|---|
| 01:MCF(SINGLE-LOC.) | ON/OFF | 01:REDIAL TRIES | 3TRY | 01:SERVICE BIT | ON/OFF |
| 02:MCF(MULTI-LOC.) | ON/OFF | 02:REDIAL INTERVAL | 3MIN | 02:MONITOR CONT. | ON/OFF |
| 03:ERR.REPORT(MCF) | ON/OFF | 03:DIAL TONE DETECT | ON/OFF | 03:COUNTRY CODE | GER |
| 04:IMAGE IN MCF | ON/OFF | 04:BUSY TONE DETECT | ON/OFF | 04:TIME/DATE PRINT | ON/OFF |
| 05:SENDER ID | ON/OFF | 05:MF(TONE)/DP(PULSE) | MF | 05:TSI PRINT | ON/OFF |
| 06:MONITOR VOLUME | LOW/MID/HIGH | 06:PULSE DIAL RATE | 10PPS | 06:TAD MODE | TYPE2 |
| 07:BUZZER VOLUME | LOW/MID/HIGH | 07:PULSE MAKE RATIO | 39% | 07:REAL TIME DIAL | TYPE2 |
| 08:CLOSED NETWORK | ON/OFF | 08:PULSE DIAL TYPE | NORMAL | 08:TEL/FAX SWITCH | ON/OFF |
| 09:TX MODE DEFAULT | STD/NORMAL | 09:MF(TONE)DURATION | 100MS | 09:MDY/DMY | MDY |
| 10:T/F TIMER PRG. | 35SEC | 10:PBX LINE | ON/OFF | 10:LONG DOC. SCAN | ON/OFF |
| 11:RING RESPONSE | 1RING | 11:PBX TYPE | NORMAL | 11:TONE FOR ECHO | ON/OFF |
| 12:DISTINCTIVE RING | ON/OFF | 12:AUTO START | ON/OFF | 12:MH ONLY | ON/OFF |
| 13:PAPER SIZE | A4 | 13:DIAL PREFIX | ON/OFF | 13:H/MODEM RATE | 33.6K |
| 14:USER LANGUAGE | ENGLISH | | | 14:T1(TX)TIMER VALUE | 059 |
| 15:INCOMING RING | ON/OFF | | | 15:T1(RX)TIMER VALUE | 035 |
| 16:REMOTE RECEIVE | ON/OFF | | | 16:T2 TIMER VALUE | 130 |
| 17:MEM/FEEDER SWITCH | MEM. | | | 17:DIS BIT32 | ON/OFF |
| 18:POWER SAVE MODE | ON/OFF | | | 18:ERR CRITERION VALUE | 10 |
| 19:ECM FUNCTION | ON/OFF | | | 19:OFF HOOK BYPASS | ON/OFF |
| 20:REMOTE DIAGNOSIS | ON/OFF | | | 20:NL EQUALIZER | 0KM |
| 21:PC/FAX SWITCH | ON/OFF | | | 21:ATTENUATOR | 10DB |
| 22:NO TONER MEM. RX | ON/OFF | | | 22:T/F TONE ATT | 10DB |
| 23:MEM FULL SAVE | ON/OFF | | | 23:MF. ATT | 3DB |
| 24:CONTINUOUS TONE | ON/OFF | | | 24:RING DURA.* | 10MS |
| 25:INSTANT DIAL | ON/OFF | | | 25:CML TIMING.* | 100MS |
| 26:RESTRICT ACCESS | ON/OFF | | | 26:LED HEAD STROBE | 10100 |
| 27:WIDTH REDUCTION | ON/OFF | | | 27:MEDIA TYPE | MEDIUM |
| 28:TONER SAVE | ON/OFF | | | 28:TR LATCH CURRENT | 0 |
| 29:CNG COUNT | 1 | | | 29:NSF SWITCH | ON/OFF |
| 30:ISDN DIAL MODE | G4 | | | 30:ID/TSI PRIORITY | ID |
| 31:SPEECH RECEIVE | ON/OFF | | | 31:TONER COUNT CLEAR | ON/OFF |
| 32:USB CONV. MODE | ON/OFF | | | 32:PARALLEL PICK UP | ON/OFF |
| 33:PAPER SIZE CHECK | ON/OFF | | | 33:V. 34 TX RETRY | ON/OFF |
| 34:PRINT JOB T.O. | 30SEC | | | 34:SYMBOL RATE | 3429 |
| | | | | 35:LEASED LINE | ON/OFF |
| | | | | 36:CED SEND | ON/OFF |

FIG.5

HELP LIST

COMMUNICATION ERROR: ERROR NO. 3122

IF YOU WERE PERFORMING G31 COMMUNICATION USING AN ISDN SWITCH SIMULATOR, THE CAUSE MAY BE THE FOLLOWING.

IN G31 COMMUNICATIONS, MODEM SIGNALS ARE CONVERTED BETWEEN ANALOG AND DIGITAL FORM SO THAT THEY CAN BE TRANSMITTED ON DIGITAL LINES. THERE ARE TWO CONVERSION SYSTEMS: μ-LAW, USED IN THE UNITED STATES AND JAPAN; AND A-LAW, USED IN OTHER COUNTRIES.

OKIFAX-ISDN USES μ-LAW IF THE COUNTRY CODE SETTING (A SERVICEMAN SETTING) IS USA; OTHERWISE, A-LAW IS USED.

CHECK WHICH SYSTEM YOUR SWITCH SIMULATOR USES (IF IT WAS MADE IN JAPAN IT WILL USE μ-LAW), AND RECHECK THE COUNTRY CODE SETTING TO MAKE SURE IT MATCHES YOUR SWITCH'S SYSTEM.

| FUNCTION/ SERVICE | OPERATION TRANSITION | SETTING NUMBERS | HELP LIST ADDRESS |
|---|---|---|---|
| COPY | COPY, [COPY, TIME-OUT] | Y13, Y27, S38, S39 | *6000 |
| TRANSMIT | [TEN, OT, AD], START | Y5, Y7, Y9, Y5, Y9, D5, D10, S12, S13, S38, S39 | *6010 |
| ⋮ | ⋮ | ⋮ | ⋮ |
| PRESCHEDULED TRANSMIT | FUNC, OT1, YES, TEN, YES, [TEN, OT, AD], START | Y5, Y7, Y9, Y5, Y9, D5, D10, S12, S13, S38, S39 | *6050 |

| FUNCTION/ SERVICE/ ERROR CODE | OPERATION TRANSITIONS | SETTING NUMBERS | HELP LIST ADDRESS |
|---|---|---|---|
| TRANSMIT | [TEN, OT, AD], START | Y5, Y7, Y9, Y5, Y9, D5, D10, S12, S13, S38, S39 | *6010 |
| ⋮ | ⋮ | ⋮ | ⋮ |
| PRESCHEDULED TRANSMIT | FUNC, OT1, YES, TEN, YES, [TEN, OT, AD], START | Y5, Y7, Y9, Y5, Y9, D5, D10, S12, S13, S38, S39 | *6050 |
| 1234 (PAPER SIZE ERROR) | | Y13 | *7030 |
| | | | |
| BA01(ISDN) | | Y30, Y31, S3, S40, S41, S42, S43 | *7100 |

DEVICE WITH AUTOMATIC HELP FUNCTION

BACKGROUND OF THE INVENTION

1. Field of the Invention

The present invention relates to a device that provides a variety of services and functions, one of which is a help function.

2. Description of the Related Art

An example of this type of device is a communication terminal device that can copy documents, transmit documents, and store documents for transmission at prescheduled times. These functions and services involve various settings: some of the settings are normally made by the user; others, including so-called dial options, for example, may be made either by the user or by a serviceman; still other settings are normally made by the serviceman and are not necessarily intelligible to the user.

With so many settings involved, when a function or service does not operate correctly, it can take the user considerable time to determine what has gone wrong. Furthermore, if the cause of the problem lies in the settings themselves, it is frequently difficult for the user to solve the problem on his own.

SUMMARY OF THE INVENTION

It is accordingly an object of the present invention to enable a user to quickly determine the cause of the problem when a function or service provided by a device fails to operate correctly.

Another object of the invention is to enable the user to solve the problem by himself.

In a device that carries out a plurality of functions or services according to a plurality of settings, and has a help function, the present invention provides a first memory storing the addresses of a plurality of help lists. Each help list corresponds to one of the services or functions, and indicates correct values of settings that are applicable when the service or function is carried out.

A second memory stores the help lists themselves, at the addresses given in the first memory. When a function or service that the device attempts to carry out fails to operate correctly, a reference unit uses information related to unexecuted operations in the function or service to find the address of the applicable help list in the first memory. A memory reading unit then reads the help list from the second memory.

The information related to unexecuted operations may be, for example, device state information, information input by the user, or an error code produced within the device.

Following the reading of the help list from the second memory, the user may be prompted to alter one of the related settings. The prompt may be made on, for example, a display panel with which the device is equipped. In addition, the help list itself may be displayed or printed for the user to peruse. The user is thereby assisted in quickly determining the cause of the problem and, if necessary, in changing the necessary settings to correct values that will solve the problem.

BRIEF DESCRIPTION OF THE DRAWINGS

In the attached drawings:

FIG. 3 is an explanatory drawing of the setting table in the first embodiment;

FIG. 4 shows a setting list used in the first embodiment;

FIG. 5 shows an example of a help list in the first embodiment;

DETAILED DESCRIPTION OF THE INVENTION

Embodiments of the invention will now be described with reference to the attached drawings.

Figure 1:
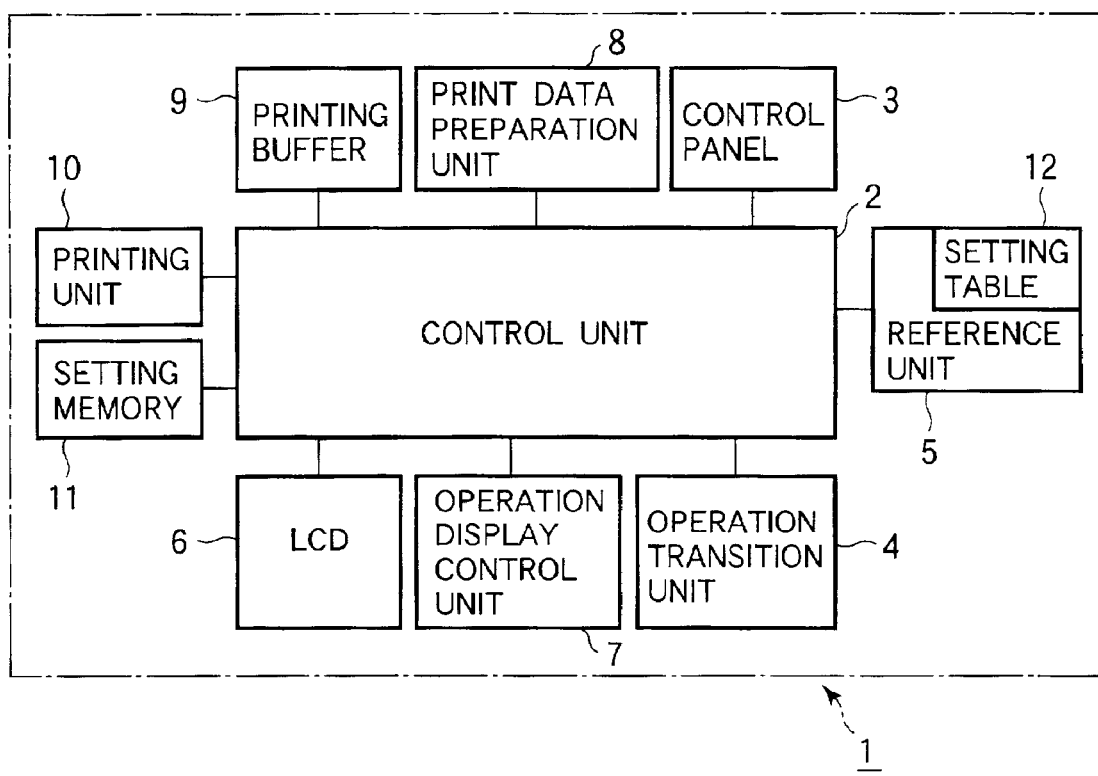
FIG. 1 is a block diagram of a communication terminal device according to a first embodiment of the invention.

As a first embodiment, FIG. 1 shows a communication terminal device 1 having a control unit 2 that controls various other units in the communication terminal device 1 to provide a variety of functions and services. In the present embodiment, these functions and services include a copy function that scans a document and prints a copy of the document, a transmit function that scans a document and transmits a facsimile image of the document to a distant communication terminal, and a prescheduled transmit service that stores scanned document image data and transmits a facsimile image of a document automatically at a preset time.

The units coupled to and controlled by the control unit 2 include a control panel 3, an operation transition unit 4, a reference unit 5, a liquid crystal display (LCD) 6, an operation display control unit 7, a print data preparation unit 8, a printing buffer 9, a printing unit 10, and a setting memory 11. Some of these units, such as the control panel 3 and LCD 6, are hardware units; other units, such as the operation transition unit 4 and reference unit 5, may be either hardware or software units. The reference unit 5 includes a setting table 12, which functions as the first memory in this embodiment. The setting memory 11 functions as the second memory.

The control panel 3 has digit keys and other keys and buttons, such as a 'Yes' button and a 'No' button, that are operated by the user to enter settings and designate operations.

Figure 2:
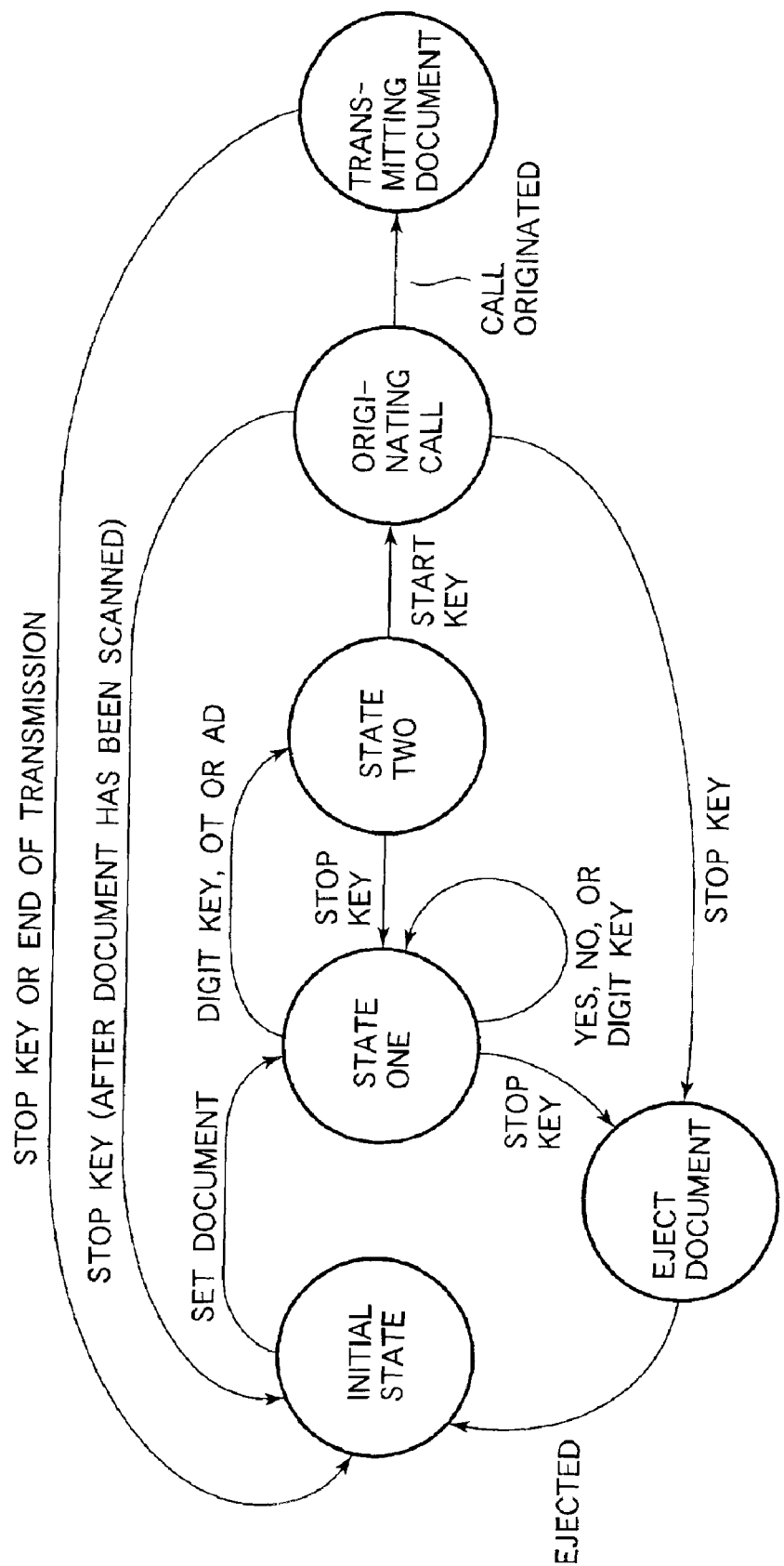
FIG. 2 shows examples of state transitions occurring in the first embodiment.

The operation transition unit 4 causes transitions of the device state to take place in an order responsive to the pressing of keys on the control panel 3, and to other operation transition information, so as to carry out one of the functions or services of the communication terminal device 1. As an example, FIG. 2 shows the state transitions involved in the execution of the transmit function. Incidentally, the notations OT (One Touch key) and AD (Auto Dial key) in FIG. 2 indicate keys that can be used instead of or in addition to the digit keys for shortcut entry of telephone numbers or facsimile numbers.

The reference unit 5 in FIG. 1 provides information that is useful when a function or service is not executed correctly. This information concerns settings, and is obtained by reference to the setting table 12.

As shown in FIG. 3, the setting table 12 is organized into a function/service column 13, an operation transition state column 14, a setting numbers column 15, and a help list address column 16. The function/service column 13 stores information specifying the functions and services of the communication terminal device 1. The operation transition state column 14 lists states to which transitions occur when the functions or services appearing in the function/service column 13 are executed. The setting numbers column 15 stores setting numbers corresponding to the contents of the function/service column 13 and operation transition state column 14. These numbers are used in prompting the user to check or modify settings when a function or service fails to be executed correctly. The help list address column 16 stores address numbers indicating the locations of help lists corresponding to the contents of the function/service column 13 and operation transition state column 14. A help list is an explanation of conceivable reasons why a service or function may be inoperable, presented in text form.

In the setting numbers column 15, the letter Y preceding a number indicates a user setting, which is normally made by the user; the letter S preceding a number indicates a serviceman setting, which is normally made by a serviceman; the letter D preceding a number indicates a dial option. Brief text descriptions of the settings are given in a setting list 17 shown in FIG. 4. Many of the settings are on/off settings; other settings take on various numeric values or other values, one typical value being shown in FIG. 4 as an example. The text descriptions in the setting list 17 are stored in the reference unit 5. Alternatively, they may be stored in the operation display control unit 7 or setting memory 11.

When a function or service is not executed correctly, the reference unit 5 compares the final state of the device (e.g., one of the states in FIG. 2) with the states listed in the operation transition state column 14 in the setting table 12 (e.g., the 'transmitting' state shown in FIG. 3). If the final state of the device matches the contents of one of the entries in the operation transition state column in the setting table 12, the reference unit 5 passes the corresponding setting numbers in the setting numbers column 15 and the corresponding address number in the help list address column 16 to the operation display control unit 7.

The LCD 6 displays information informing the user of operation transitions, and gives prompts for checking and modifying settings.

The operation display control unit 7 issues requests to have various information and prompts displayed on the LCD 6. One prompt displayed by the LCD 6 at the request of the operation display control unit 7 is a prompt such as "Turn help function on?" asking the user if he wants to use the help function provided by the communication terminal device 1. Another is a prompt such as "Completed OK?" which is displayed when a function or service is completed, to ask the user if the function or service was executed as the user intended.

The operation display control unit 7 may also request the display on the LCD 6 of the current status of a user setting, serviceman setting, or dial option specified by a setting number sent from the reference unit 5. In addition, on reception of an address number stored in the help list address column 16 from the reference unit 5, the operation display control unit 7 requests the LCD 6 to display a prompt such as "Print help list?" asking the user whether to print the applicable help list. If the user requests printing of the help list, the operation display control unit 7 transfers the address number of the help list sent from the reference unit 5 to the print data preparation unit 8.

When the print data preparation unit 8 receives an address indicating the storage location of a help list in the setting memory 11, it uses the address to find the help list, reads the help list from the setting memory 11, thus functioning as a memory reading unit, creates corresponding print data in bit-mapped image form, and sends the created print data to the printing buffer 9. The printing buffer 9 receives and temporarily stores the help list print data created by the print data preparation unit 8. The printing unit 10 prints the print data stored in the printing buffer 9 on a printing medium (e.g., paper, not shown in the drawing). In this way a help list is displayed to the user.

An example of a help list is shown in FIG. 5. In this help list, incidentally, G31 designates a certain facsimile communication standard, ISDN stands for Integrated Services Digital Network, and Okifax is a product name. Help lists are stored with the corresponding address numbers attached.

In addition to storing help lists, the setting memory 11 stores a table of the current values of the user settings, serviceman settings, and dial options, and another table of the original or default values of the settings. These tables may be stored in a simple machine-readable numeric form, without text descriptions. In carrying out the functions and services of the communication terminal device 1, the control unit 2 operates according to the current setting values stored in the setting memory 11.

Figure 6A:
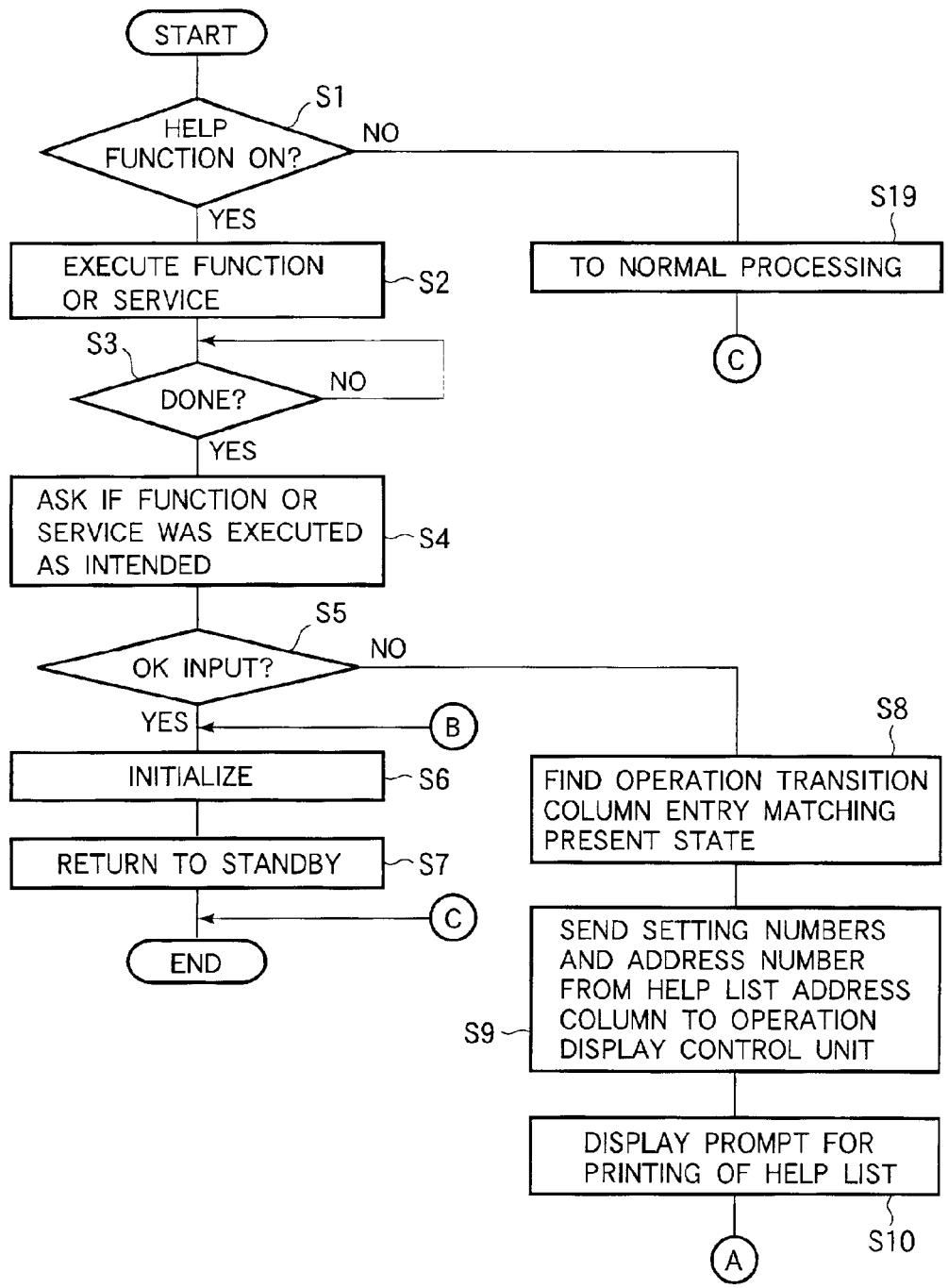
FIGS. 6A and 6B are a flowchart illustrating the operation of the first embodiment.

Various operations of the communication terminal device 1 will now be described with reference to FIGS. 1 to 4 and the flowchart shown in FIGS. 6A and 6B.

In this flowchart, the communication terminal device 1 is assumed to remain in the standby mode until the user turns the help function on. The function or service that will be executed is a facsimile transmission to a distant communication terminal device. The flowchart begins with the LCD 6 displaying the prompt "Turn help function on?" under the control of the operation display control unit 7 (step S1 in FIG. 6A).

In this example, the user intends to use the 'transmit' function or service provided by the communication terminal device 1 with the assistance of the help function, so he presses a key or button such as the 'Yes' button on the control panel 3 to turn the help function on, and presses other keys or buttons to initiate the transmitting operation, causing processing to proceed from step S1 to step S2. If the user turns the help function off, step S1 is followed by step S19 and conventional facsimile transmission processing is carried out, without the help function. Since the user has turned the help function on, however, signals indicating that 'transmit' is in the 'on' state with the help function enabled are sent from the control panel 3 to the operation transition unit 4. On reception of these signals, the operation transition unit 4 causes the device state to change according to the state transition diagram shown in FIG. 2, based on the information the user has entered from the control panel 3. The control unit 2 executes appropriate operations corresponding to each state to which a transition occurs (step S2).

When the operation transition unit 4 determines that the execution of the necessary operations has been completed (step S3), the operation display control unit 7 requests the LCD 6 to display the prompt "Completed OK?". The LCD 6 displays the prompt as requested (step S4) and the control unit 2 waits for the user to answer (step S5). If the user presses the 'Yes' button on the control panel 3 to indicate that the function or service was executed as intended, the operation transition unit 4 initializes the device state (step S6), and the communication terminal device 1 returns to the standby mode (step S7).

If the user presses the 'No' button on the control panel 3 in step S5 to indicate that the function or service was not executed as intended, the reference unit 5 compares the final state of the communication terminal device 1 to which a transition was caused to occur by the operation transition unit 4 (e.g., one of the states in FIG. 2) with the contents of the entries in the operation transition state column 14 in the setting table 12 shown in FIG. 3, searching this table sequentially from the top to find an entry that matches the final state of the communication terminal device 1 (step S8).

When the reference unit 5 finds an entry in the operation transition state column 14 in the setting table 12 matching the final state of the communication terminal device 1, it sends the corresponding setting numbers from the setting numbers column 15, indicating the settings related to that state, and the corresponding address number from the help list address column 16, indicating the storage location of the relevant help list, to the operation display control unit 7 (step S9). For example, if the final state of the communication terminal device 1 is the transmitting state, the reference unit 5 sends the setting numbers Y5, Y7, Y9, D5, D10, S12, S13, S38, and S39 listed in the setting numbers column 15 and the address number '6010' given in the help list address column 16 to the operation display control unit 7.

Figure 6B:
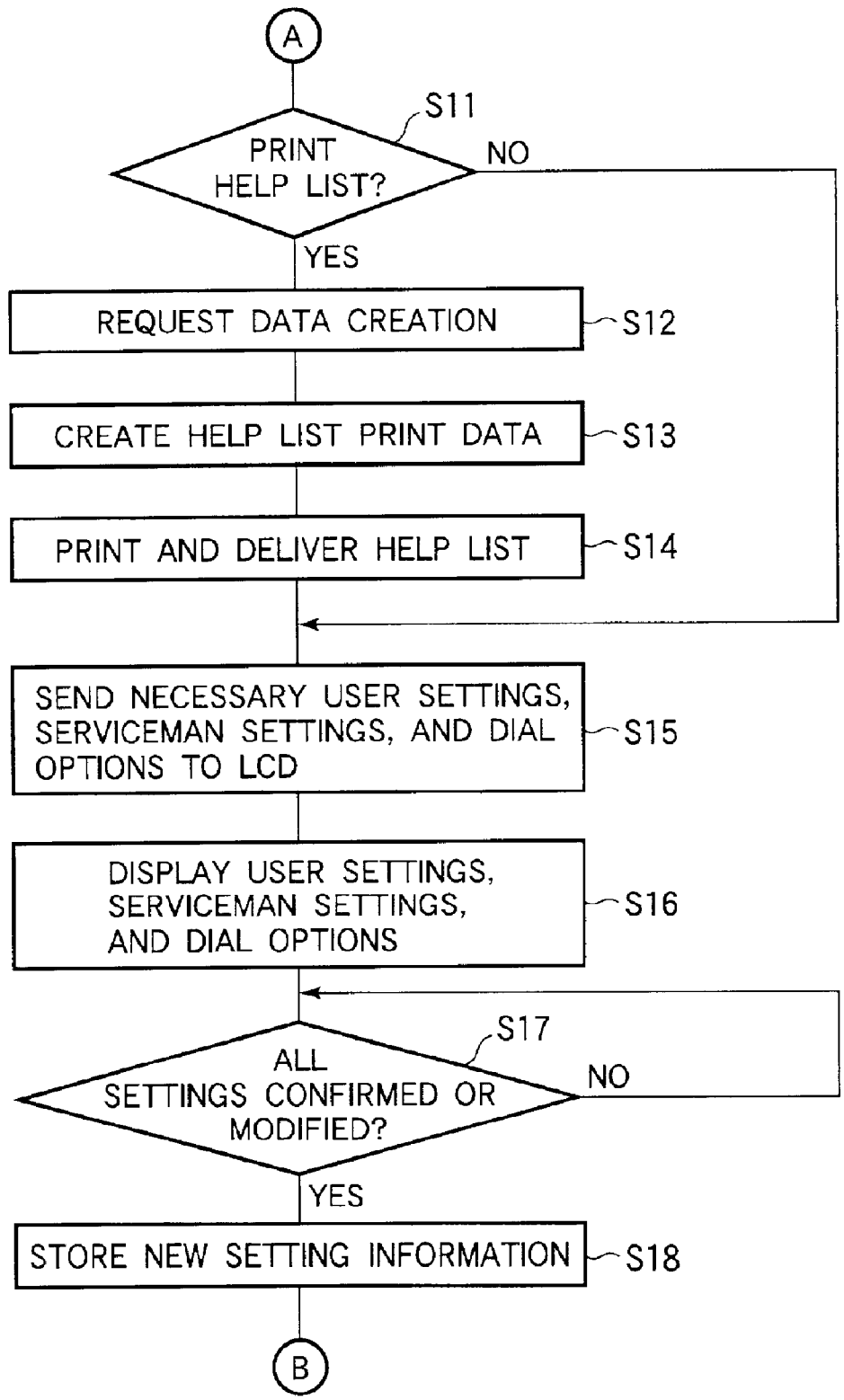

The operation display control unit 7 now requests the display of the prompt "Print help list?" The LCD 6 displays the requested prompt (step S10) and the control unit 2 waits for the user to answer (step S11 in FIG. 6B).

If the user presses the 'No' button on the control panel 3 to decline the printing of the help list in step S11, processing proceeds to step S15. If the user presses the 'Yes' button to request printing of the help list, the operation display control unit 7 sends the address number indicating the storage location of the help list in the help list address column 16 to the print data preparation unit 8 to have print data created for the help list (step S12).

On reception of the address number indicating the storage location of the help list from the operation display control unit 7, the print data preparation unit 8 uses it to read the help list from the setting memory 11, and creates print data for the help list (step S13). When the print data have been created, the print data preparation unit 8 stores the created print data in the printing buffer 9 temporarily. The printing unit 10 then prints and delivers the help list under the control of the control unit 2 (step S14).

Using the setting numbers that were listed in the setting numbers column 15 in the setting table 12, which have been sent from the reference unit 5, the operation display control unit 7 now reads the values of the relevant user settings, serviceman settings, and dial options from the setting memory 11, combines these values with the text descriptions of the settings given in the setting list 17, and sends the resulting human-readable descriptions of the current status of the relevant settings to the LCD 6 to be displayed (step S15). The LCD 6 displays the information it has received from the operation display control unit 7 (step S16).

The user peruses the display on the LCD 6 to check the settings and modifies them as necessary from the control panel 3. If an error has occurred because the fifth user setting (sender ID) is 'on', for example, the user can see from the LCD display 6 that this setting is turned on, can tell by reading the help list that this setting must be turned off, and can change the setting from 'on' to 'off' from the control panel 3. If a setting does not need to be modified, the user confirms the setting by pressing a key or button to proceed to the next setting.

The control unit 2 receives signals from the control panel 3 indicating whether each setting has been confirmed or modified (step S17). When all settings have been confirmed or modified, the control unit 2 stores any new (that is, modified) setting information in the setting memory 11, thus updating the current values of the settings (step S18), then proceeds to step S6 to initialize the device state and return to the standby mode. The storage of the modified setting information enables the communication terminal device 1 to operate correctly when restarted.

As described above, according to the first embodiment of the invention, if one of the plurality of functions and services provided by the communication terminal device 1 cannot be executed as intended and the cause of the problem lies in a user setting, serviceman setting, or dial option, it becomes possible for the device to use the state transition diagram shown in FIG. 2 and the setting table 12 shown in FIG. 3 to find and print the relevant help list, thereby enabling the user to determine the cause of the problem quickly and change settings as necessary. This can save the user considerable time that would otherwise be spent looking up the device specifications in a manual in order to check and modify the settings. Therefore, when the cause of a problem lies in a user setting, serviceman setting, or dial option, this embodiment makes it easier for the user to solve the problem by himself.

A second embodiment of the invention will now be described, omitting descriptions of elements that are the same as in the first embodiment.

Figures 7, 8:
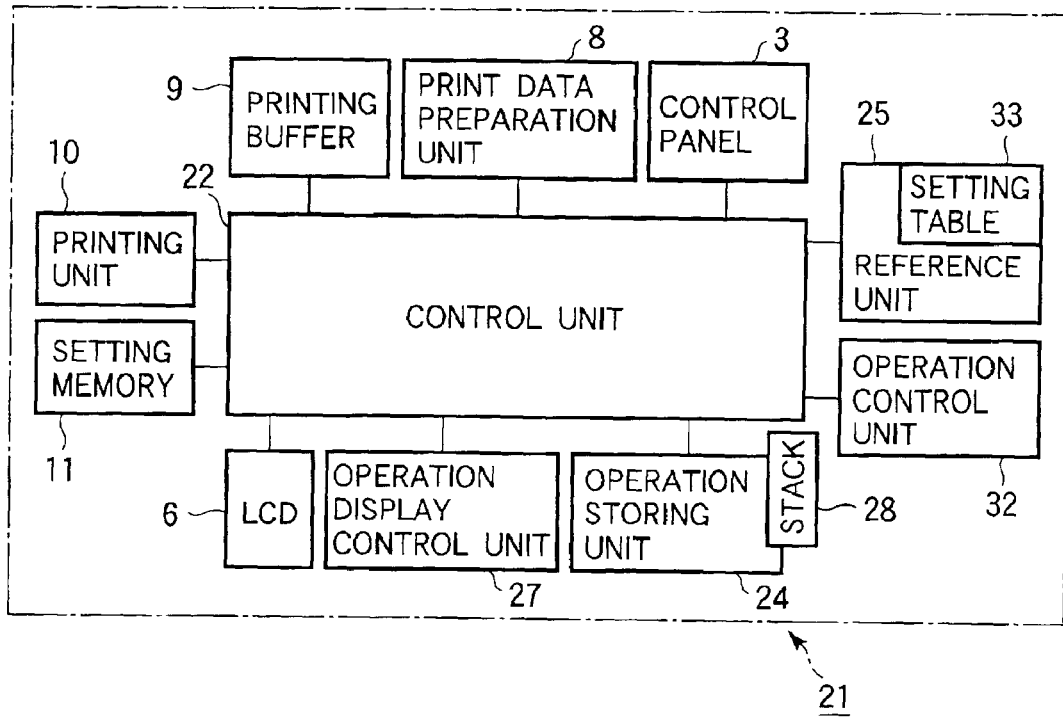
FIG. 7 is a block diagram showing the structure of a communication terminal device according to a second embodiment of the invention.
FIG. 8 is an explanatory drawing of the setting table in the second embodiment.

Referring to FIG. 7, the communication terminal device 21 in the second embodiment includes a control unit 22 that is coupled to a control panel 3, an LCD 6, a print data preparation unit 8, a printing buffer 9, a printing unit 10, a setting memory 11, an operation storing unit 24, a reference unit 25, an operation display control unit 27, and an operation control unit 32. The control unit 22 controls the other units to provide a variety of functions and services, much as in the first embodiment. The control panel 3, LCD 6, print data preparation unit 8, printing buffer 9, printing unit 10, and setting memory 11 are identical to the corresponding elements in the first embodiment. The operation storing unit 24 includes a cumulative memory or stack 28.

The reference unit 25 includes a setting table 33, part of which is shown in FIG. 8. The setting table 33 stores setting numbers that are used in prompting the user to check or modify settings when a function or service of the communication terminal device 21 fails to be executed correctly. The settings to be checked or modified may be user settings, serviceman settings, or dial options. The setting table 33 is organized into a function/service column 34, an operation transitions column 35, a setting numbers column 36, and a help list address column 37. As in the first embodiment, a help list is an explanation of conceivable reasons why a function or service may be inoperable, presented in text form, advising the user of correct setting information needed to execute the corresponding function or service at the stage following each operation transition.

Figure 9:
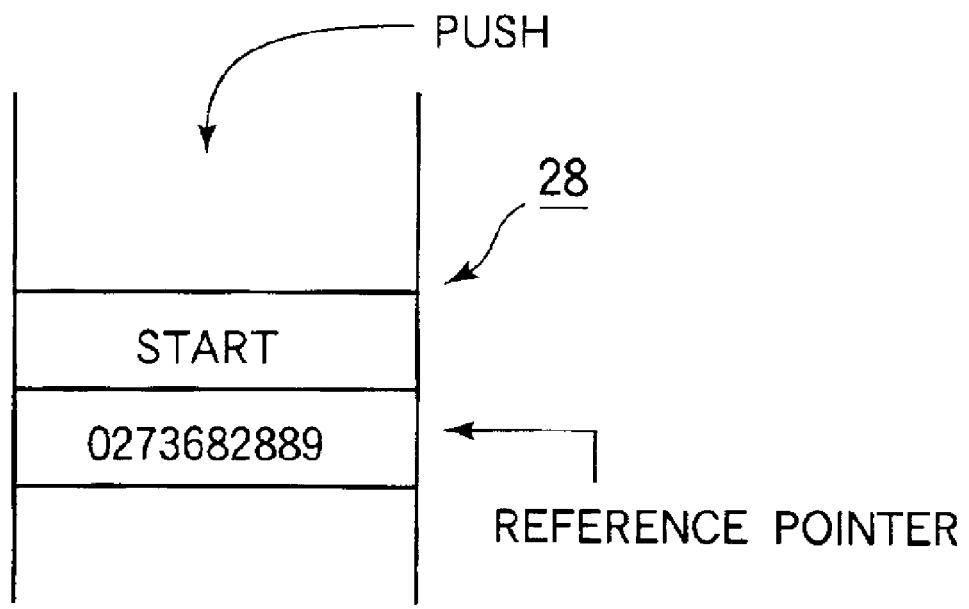
FIG. 9 is an explanatory drawing of the stack at the time of transmission of a document in the second and third embodiments.

When a function or service is not executed correctly, the reference unit 25 compares the operation transitions shown in the operation transitions column 35 in the setting table 33 with operation transition information and key-press information accumulated on the stack 28, shown in FIG. 9. If the information on the stack 28 matches the contents and sequence of one of the entries in the operation transitions column 35, the reference unit 25 passes the corresponding setting numbers in the setting numbers column 36 and the corresponding address number in the help list address column 37 to the operation display control unit 27.

In FIG. 8, the functions and services of the communication terminal device 21, such as 'copy', 'transmit', and 'prescheduled transmit', are indicated in the function/service column 34 of the setting table 33. The operation transitions column 35 stores the minimal sequence of operation transitions (following the key or button input sequence) required to execute the function or service appearing in the function/service column 34.

The minimal sequence of operation transitions required to transmit a document, for example, is a sequence of key operations including the pressing of digit keys or one of the shortcut keys (OT or AD) to enter a telephone number or facsimile number, followed by a press of the 'Start' button. The word 'ten' in FIG. 8 indicates an arbitrary series of digits, not necessarily ten digits in length but made up of one or more of the ten digits from 0 to 9; the brackets and commas indicate that either such a digit sequence is entered or the OT button or the AD button is pressed. The operation transition sequence may also include transitions caused by key operations for designating the resolution and darkness of the transmitted image of the document, but it is possible to transmit a facsimile image of a document without these key operations, so the minimum sequence of operation transitions does not include them, and they are accordingly excluded from the operation transitions column 35.

The setting numbers column 36 stores setting numbers corresponding to the contents of the function/service column 34 and operation transitions column 35. As in the first embodiment, the letter Y indicates a user setting, the letter S a serviceman setting, and the letter D a dial option, and the setting memory 11 stores a table giving the current values of the settings. A setting list 17 giving text descriptions of the settings is also stored in the setting memory 11, reference unit 25, operation display control unit 27, or elsewhere. The help list address column 37 stores address numbers indicating the storage locations of the relevant help lists in the setting memory 11.

The operation storing unit 24 maintains the stack 28 as shown in FIG. 9, by writing or 'pushing' operation transition information and key-press or button-press information in the sequence in which the operations take place or the keys or buttons are pressed. The operation storing unit 24 also reads or 'pulls' the information accumulated on the stack 28 in first-in-first-out (FIFO) order and passes it to the operation control unit 32, and deletes information from the stack 28 when commanded to do so by the operation control unit 32.

In addition to the functions of requesting the LCD 6 to display descriptions of user settings, serviceman settings, and dial options, based on setting numbers sent from the reference unit 25, so that the user can check and modify the settings as in the first embodiment, the operation display control unit 27 in the second embodiment has the further function of requesting the LCD 6 to display the prompt "Re-execute?" asking the user whether to re-execute a previous sequence of operations, after the user has confirmed the settings and made any necessary modifications thereof.

If the user presses the 'Yes' button to request the re-execution of previous operations, the operation control unit 32 re-executes the previous operations automatically by causing device state transitions that trace the previous sequence of states according to the information accumulated on the stack 28, which is sent from the operation storing unit 24. On completion of the re-execution, the operation control unit 32 has the accumulated information deleted from the stack 28.

Figure 10A:
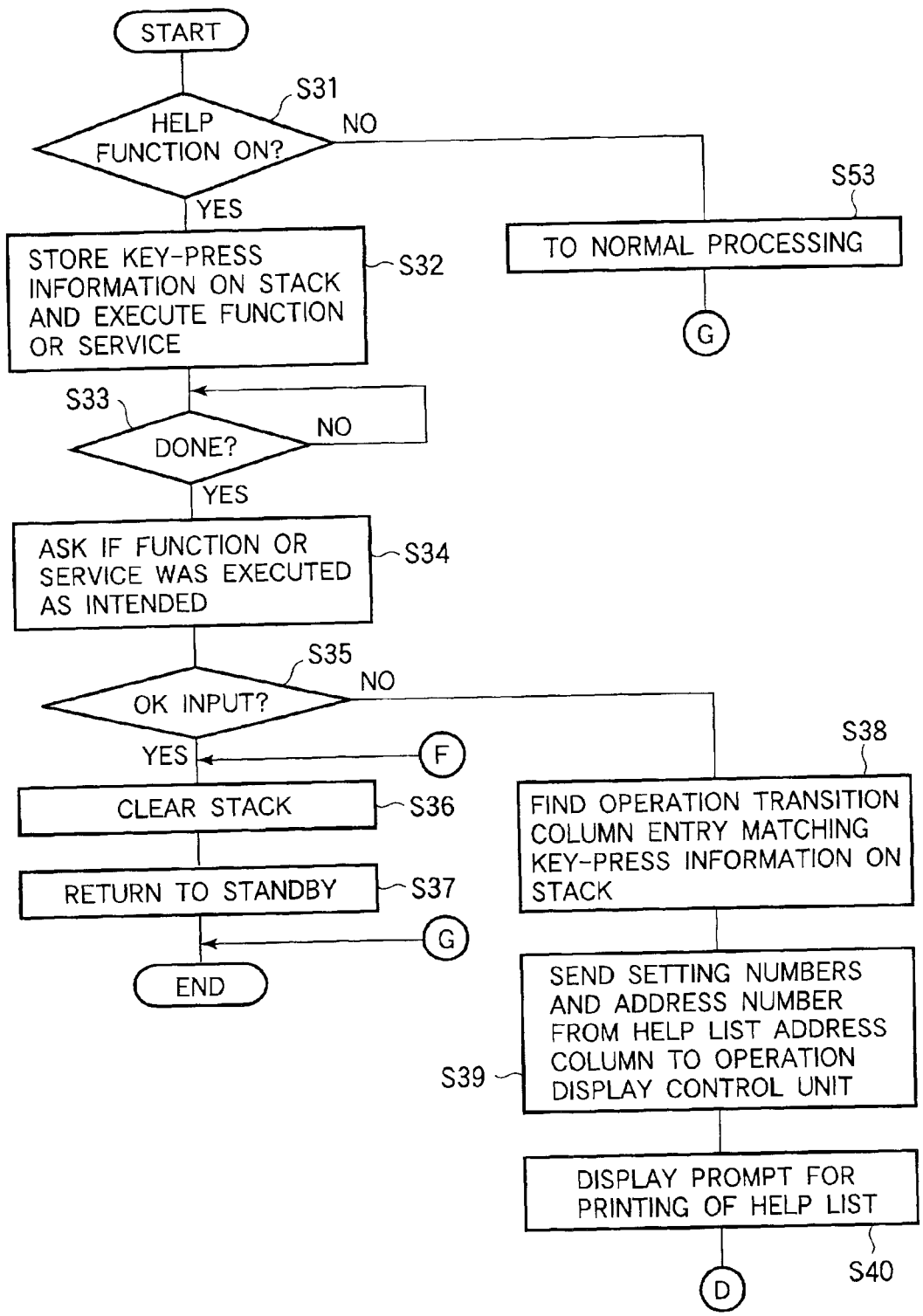
FIGS. 10A, 10B, and 10C are a flowchart illustrating the operation of the second embodiment.

The operation of the communication terminal device 21 will now be described with reference to FIGS. 7 to 9 and the flowchart shown in FIGS. 10A, 10B, and 10C.

In this flowchart, the function or service that will be executed is again the transmission of facsimile data to a distant communication terminal device, and the communication terminal device 21 is assumed to remain in the standby mode until the user turns the help function on. The flowchart begins with the LCD 6 displaying the prompt "Turn help function on?" under the control of the operation display control unit 27 (step S31 in FIG. 10A).

Since the user intends to use the transmission function or service provided by the communication terminal device 1 with the assistance of the help function, he presses a key or button such as the 'Yes' button on the control panel 3 to turn the help function on. After turning on the help function, the user enters a destination telephone or facsimile number by pressing a series of digit keys on the control panel 3. If necessary, the user may also designate the resolution and darkness of the document image to be transmitted by pressing further keys on in the control panel 3. Finally, the user presses the 'Start' button to start transmitting the document image, at which point processing proceeds from step S31 to step S32.

If the user turns the help function off, step S31 is followed by step S53 and conventional facsimile transmission processing is carried out.

When the user presses the 'Start' button, key-press information (information indicating the above sequence of key and button presses) is sent from the control panel 3 to the operation storing unit 24, together with a signal indicating that 'transmit' is in the 'on' state with the help function enabled. On reception of this signal and key-press information, the operation storing unit 24 first pushes the key-press information designating the transmission destination onto the stack 28, as shown in FIG. 9. Next, if keys or buttons were pressed to designate the resolution and darkness of the image to be transmitted, corresponding key-press information would be pushed onto the stack 28 (in this example, it is assumed that these keys or buttons were not pressed). Finally, the operation storing unit 24 pushes key-press information indicating pressing of the 'Start' button onto the stack 28. Then the control unit 22 executes the document transmission function or service according to the key-press information stored on the stack 28 (step S32). Information about keys or buttons pressed after the execution of this function or service is not stored on the stack 28.

When the operation storing unit 24 determines that the execution of the necessary operations has been completed (step S33), the operation display control unit 27 requests the display of the prompt "Completed OK?". The LCD 6 displays the prompt as requested (step S34) and the control unit 22 waits for the user to answer the prompt (step S35). If the user presses the 'Yes' button on the control panel 3 to indicate that the function or service was executed as intended, the operation storing unit 24 clears the stack 28 by deleting the key-press information stored thereon (step S36), and the communication terminal device 21 returns to the standby mode (step S37).

If the user presses the 'No' button on the control panel 3 in step S35 to indicate that the function or service was not executed as intended, the reference unit 25 compares the key-press information accumulated on the stack 28 with the entries in the operation transitions column 35 in the setting table 33. Specifically, the reference unit 25 moves a reference pointer sequentially from the bottom to the top of the stack 28 and reads the information indicated by the reference pointer, thus first reading the sequence of digit keys that designated the destination number, then reading information indicating that the 'Start' button was pressed, as shown in FIG. 9, and compares the information thus read from the stack 28 with the contents of the operation transitions column 35 in the setting table 33 (step S38). In the comparison, the amount of information may differ, provided the matching type of information appears in the matching sequence. For example, the number of keys pressed may differ depending on whether the resolution and darkness of the document image to be transmitted were designated or not. In this embodiment, in which the user transmits the document without designating the resolution and darkness, the key-press information stored on the stack 28 closely matches the entry in the operation transitions column 35 shown in FIG. 8. If the user had designated the resolution and darkness, there would be additional information on the stack 28, but a match would still be recognized.

After comparing the key-press information on the stack 28 with the entries in the operation transitions column 35 in the setting table 33 and finding an entry that matches the content and sequence of the key-press information on the stack 28, the reference unit 25 reads the corresponding setting numbers from the setting numbers column 36 and the corresponding address number that indicates the storage location of the related help list from the help list address column 37, and sends them to the operation display control unit 27. In this example, the key-press information on the stack 28 includes a telephone or facsimile number input by pressing a series of digit keys, and information indicating the pressing of the 'Start' button, so the reference unit 25 sends the setting numbers Y5, Y7, Y9, Y5, D5, D10, S12, S13, S38, and S39, found in the setting numbers column 36 in correspondence to '[ten, OT, AD], start' in the operation transitions column 35, to the operation display control unit 27, together with the address number "6010" from the help list address column 37 (step S39).

Figure 10B:
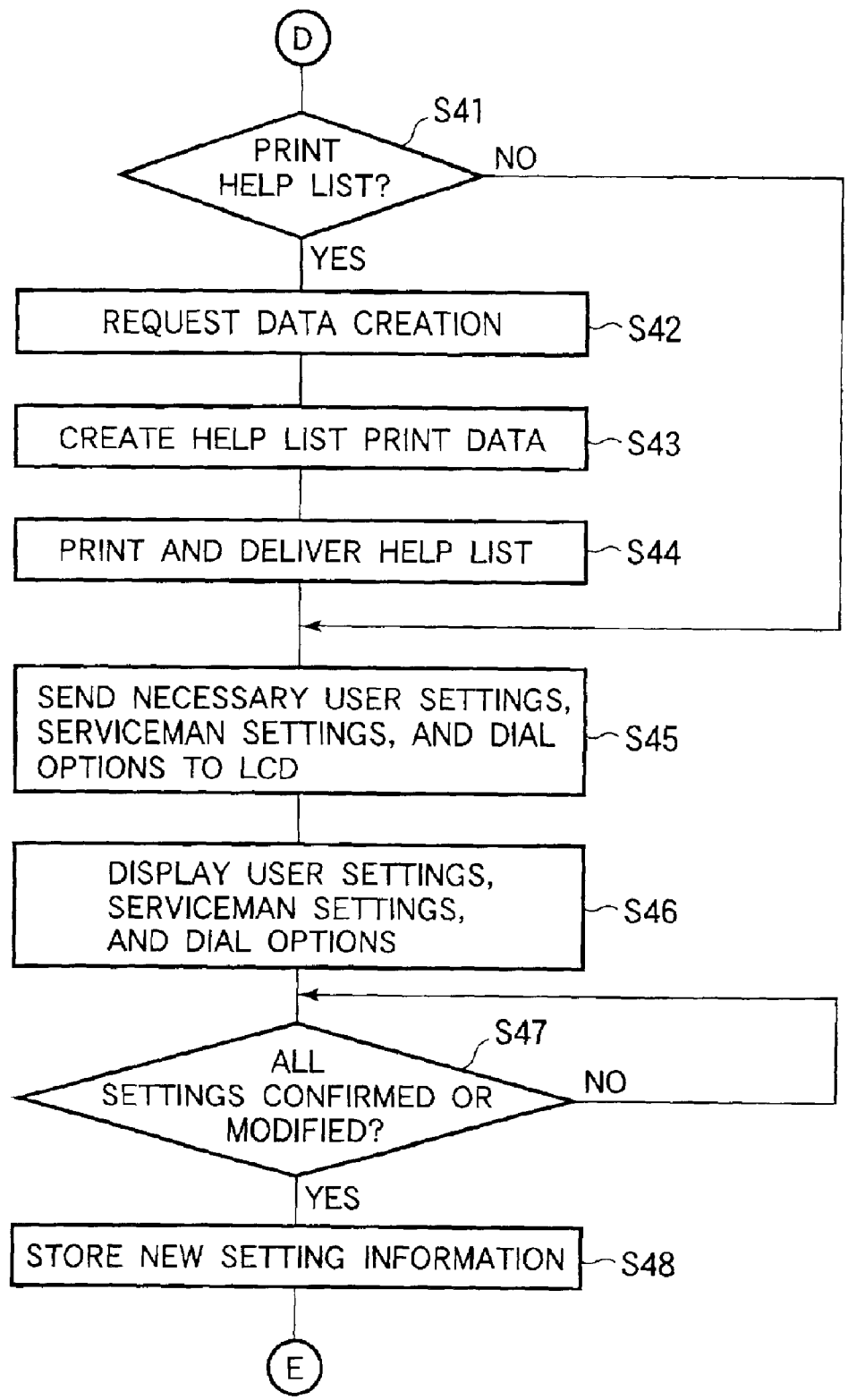
Figure 10C:
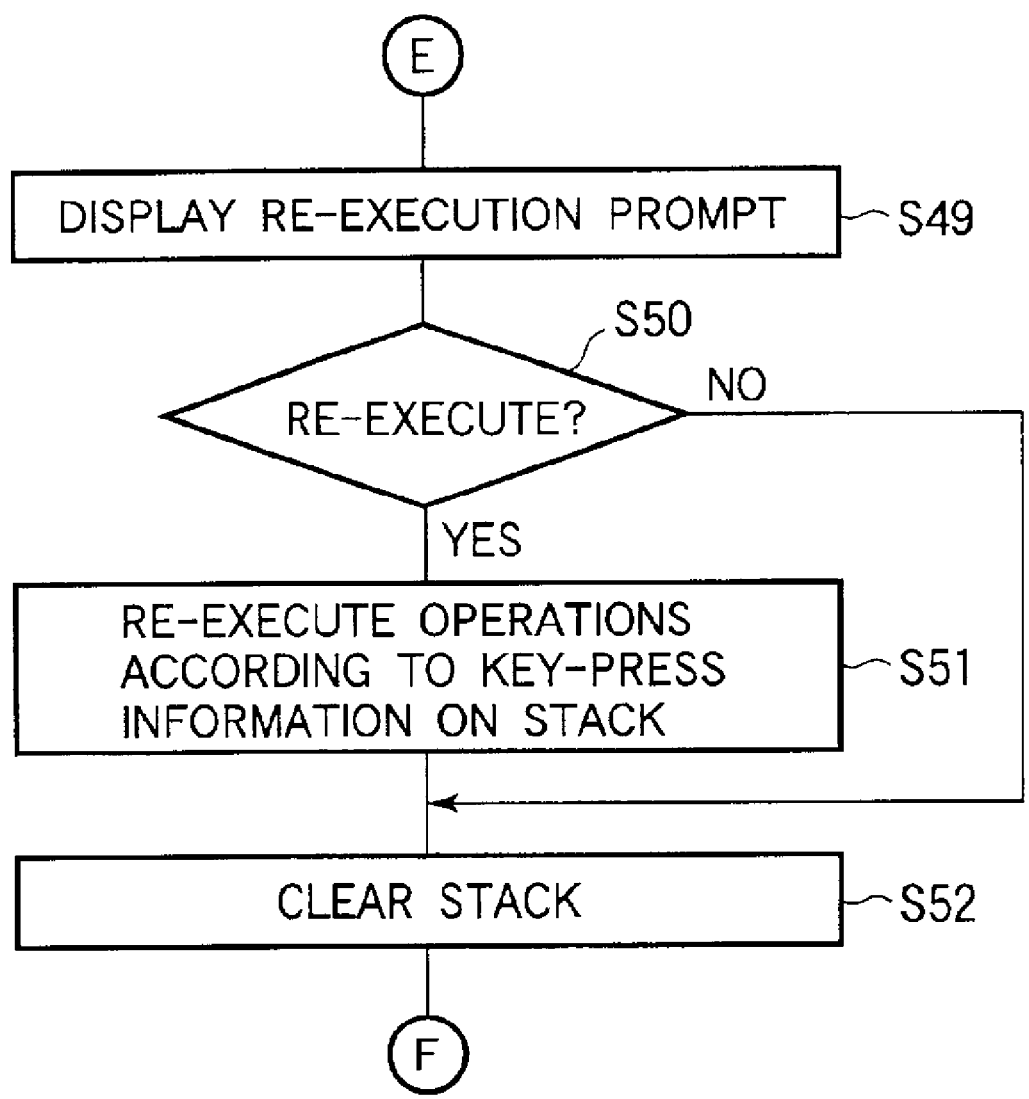

On reception of the setting numbers and the address number, the operation display control unit 27 requests the LCD 6 to display the prompt "Print help list?" The LCD 6 displays the prompt as requested (step S40), and the control unit 22 waits for the user to answer (step S41 in FIG. 10B).

If the user presses the 'No' button on the control panel 3 to decline the printing of the help list in step S11, processing proceeds to step S45. If the user presses the 'Yes' button to request printing of the help list, the operation display control unit 27 sends the address number in the help list address column 37, indicating the storage location of the help list, to the print data preparation unit 8 to have print data created for the help list (step S42).

The print data preparation unit 8 reads the help list from the setting memory 11 by using the address number indicating the storage location of the help list sent from the operation display control unit 27, and creates print data for the help list (step S43). The printing buffer 9 stores the help list print data temporarily, and the printing unit 10 prints and delivers the help list under the control of the control unit 22 (step S44).

Using the setting numbers listed in the setting numbers column 36 in the setting table 33, which have been sent from the reference unit 25, the operation display control unit 27 reads the necessary user settings, serviceman settings, and dial options from the setting memory 11, adds text descriptions taken from the setting list 17, and sends the resulting information to the LCD 6 to be displayed (step S45). The LCD 6 displays descriptions of the settings it has received from the operation display control unit 27 (step S46).

The user peruses the display on the LCD 6 to check the settings and modifies them as necessary from the control panel 3. If an error has occurred because the 'sender ID' user setting is 'on', for example, the user sees from the LCD display 6 that this setting is turned on, and from the help list that it must be turned off, and changes the setting from 'on' to 'off' from the control panel 3.

The control unit 22 receives signals from the control panel 3 indicating whether each setting has been confirmed or modified (step S47) and sends any new (modified) setting information to the setting memory 11, in which it is stored (step S48). The operation display control unit 27 now requests the LCD 6 to display the prompt "Re-execute?" The LCD 6 displays this prompt as requested (step S49 in FIG. 10C), and the device waits for the user to answer (step S50).

If the user presses the 'Yes' button to request re-execution of the function or service that failed to be executed correctly, the operation storing unit 24 passes the key-press information stored on the stack 28 shown in FIG. 9 to the operation control unit 32 in first-in-first-out order. The operation control unit 32 re-executes the transmission operation by causing device state transitions that retrace the previous transitions according to the key-press information sent from the operation storing unit 24, operating according to the new setting values stored in the setting memory 11 (step S51). On completion of the re-execution, the operation control unit 32 has the operation storing unit 24 clear the stack 28 by deleting its stored information (step S52), and the communication terminal device 21 returns to the standby mode (step S37).

If the user presses the 'No' button in step S50 to decline re-execution of the function or service that failed to be executed correctly, step S51 is skipped and the operation proceeds directly to step S52.

The second embodiment provides the same effects as the first embodiment, and by means of the stack 28, provides the further effect of remembering operation transitions. As a result, after the user has checked settings and made any necessary modifications, if a function or service that was not executed correctly must be re-executed, this can be done automatically by having the communication terminal device 21 refer to the key-press information accumulated on the stack 28, thereby sparing the user having to repeat the same key and button operations again, and providing the communication terminal device 21 with improved operability.

A third embodiment will now be described, omitting descriptions of elements that are the same as in the preceding embodiments.

Figures 11, 12:
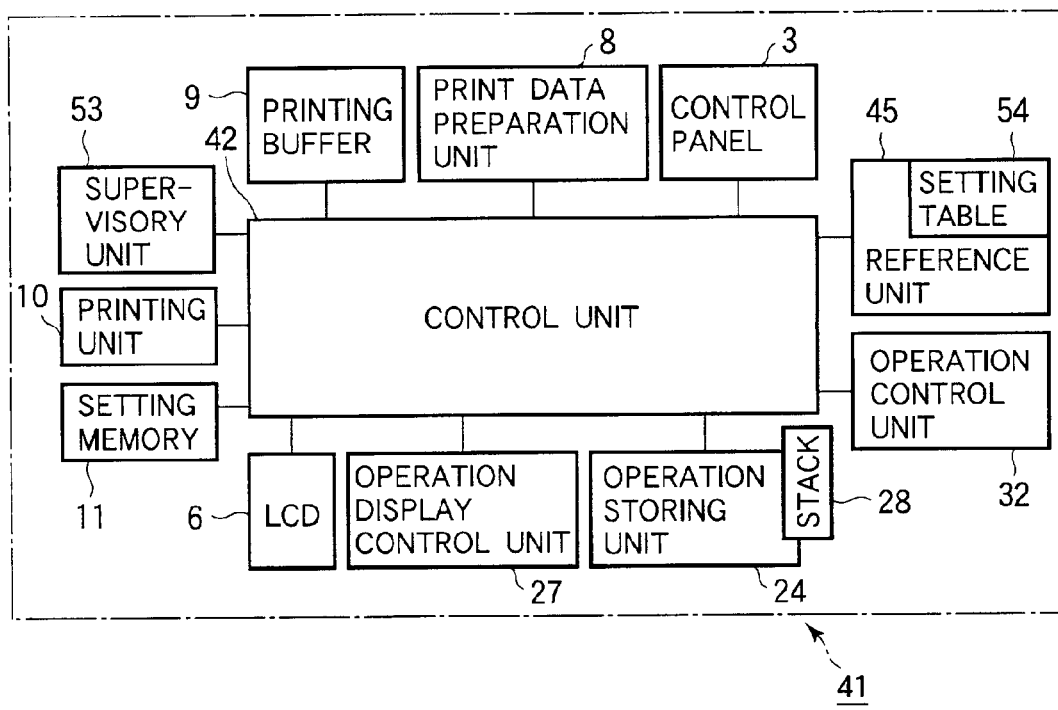
FIG. 11 is a block diagram showing the structure of a communication terminal device according to the third embodiment of the invention.
FIG. 12 is an explanatory drawing of the setting table in the third embodiment.

Referring to FIG. 11, the communication terminal device 41 in the third embodiment includes a control unit 42 that is coupled to a control panel 3, an LCD 6, a print data preparation unit 8, a printing buffer 9, a printing unit 10, a setting memory 11, an operation storing unit 24 with a stack 28, an operation display control unit 27, an operation control unit 32, a reference unit 45, and a supervisory unit 53.

The control panel 3, LCD 6, print data preparation unit 8, printing buffer 9, printing unit 10, and setting memory 11 are identical to the corresponding elements in the first embodiment. The operation storing unit 24, stack 28, operation display control unit 27, and operation control unit 32 are identical to the corresponding elements in the second embodiment.

The reference unit 45 includes a setting table 54, part of which is shown in FIG. 15. The setting table 54 stores setting numbers that are used in prompting the user to check or modify user settings, serviceman settings, or dial options when a function or service fails to be executed correctly. The setting table 54 is organized into a function/service/error-code column 55, an operation transitions column 56, a setting numbers column 57, and a help list address column 58. As in the preceding embodiments, a help list is an explanation of conceivable reasons why a function or service may be inoperable, presented in text form.

As shown in FIG. 12, the function/service/error-code column 55, operation transitions column 56, setting numbers column 57, and help list address column 58 in the setting table 54 contain information similar to that in the corresponding columns in the setting table 33 in the second embodiment. In addition, the function/service/error-code column 55 contains error codes. Different error codes indicate different types of errors: for example, error code '1234' indicates a paper size error, and error code 'BA01' an ISDN error. For each error code, the setting numbers column 57 contains the setting numbers of settings that might have caused the error, and the help list address column 58 stores the address in the setting memory 11 of a help list describing conceivable causes of the error.

When a paper size error occurs, for example, one likely cause is the 'paper size' setting, which is the thirteenth setting in the user setting (Y) column in FIG. 4, so the setting numbers column 57 lists the setting Y13 corresponding to the error code '1234' in the function/service/error code column 55, and the help list address column 58 stores the address '7030' in the setting memory 11 of a help list describing various causes of paper size errors.

The operation transitions column 56 does not list any operation transition information corresponding to the error codes in the function/service/error code column 55.

The supervisory unit 53 monitors the state of the communication terminal device 41 to detect errors. When the supervisory unit 53 detects an error, it sends a corresponding error code to the reference unit 45. When a function or service is executed without the detection of an error, the supervisory unit 53 notifies the operation storing unit 24 that the service or function has been executed correctly.

In addition to the functions provided by the reference unit 25 in the second embodiment, the reference unit 45 provides a further function of searching for an error code in the function/service/error code column 55 in the setting table 54 matching an error code received from the supervisory unit 53, and sending the corresponding setting numbers, which are stored in the setting numbers column 57, and the address number of the applicable help list in the setting memory 11, which is stored in the help list address column 58, to the operation display control unit 27.

Figure 13A:
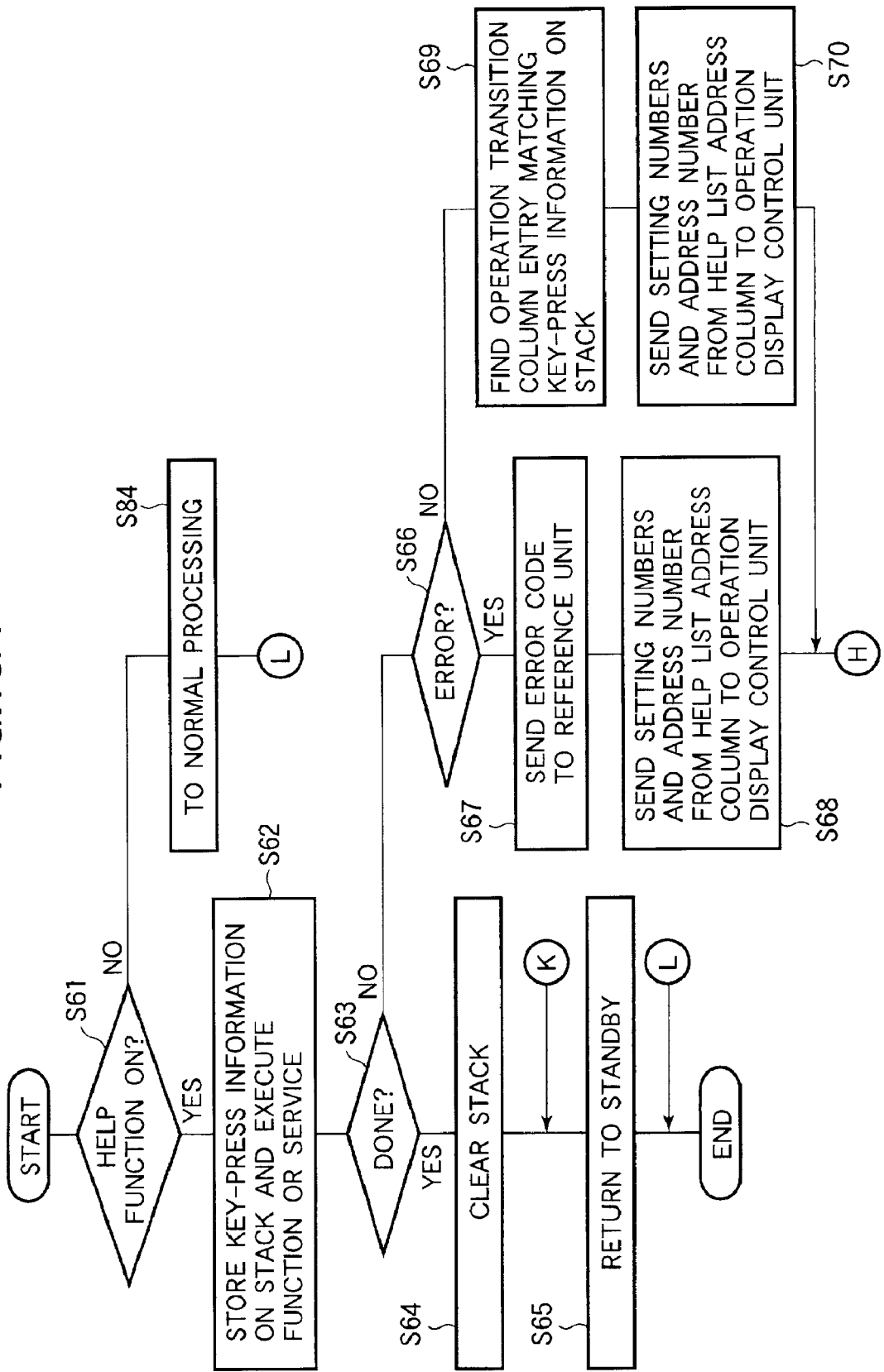
FIGS. 13A, 13B, and 13C are a flowchart illustrating the operation of the third embodiment.
Figure 13B:
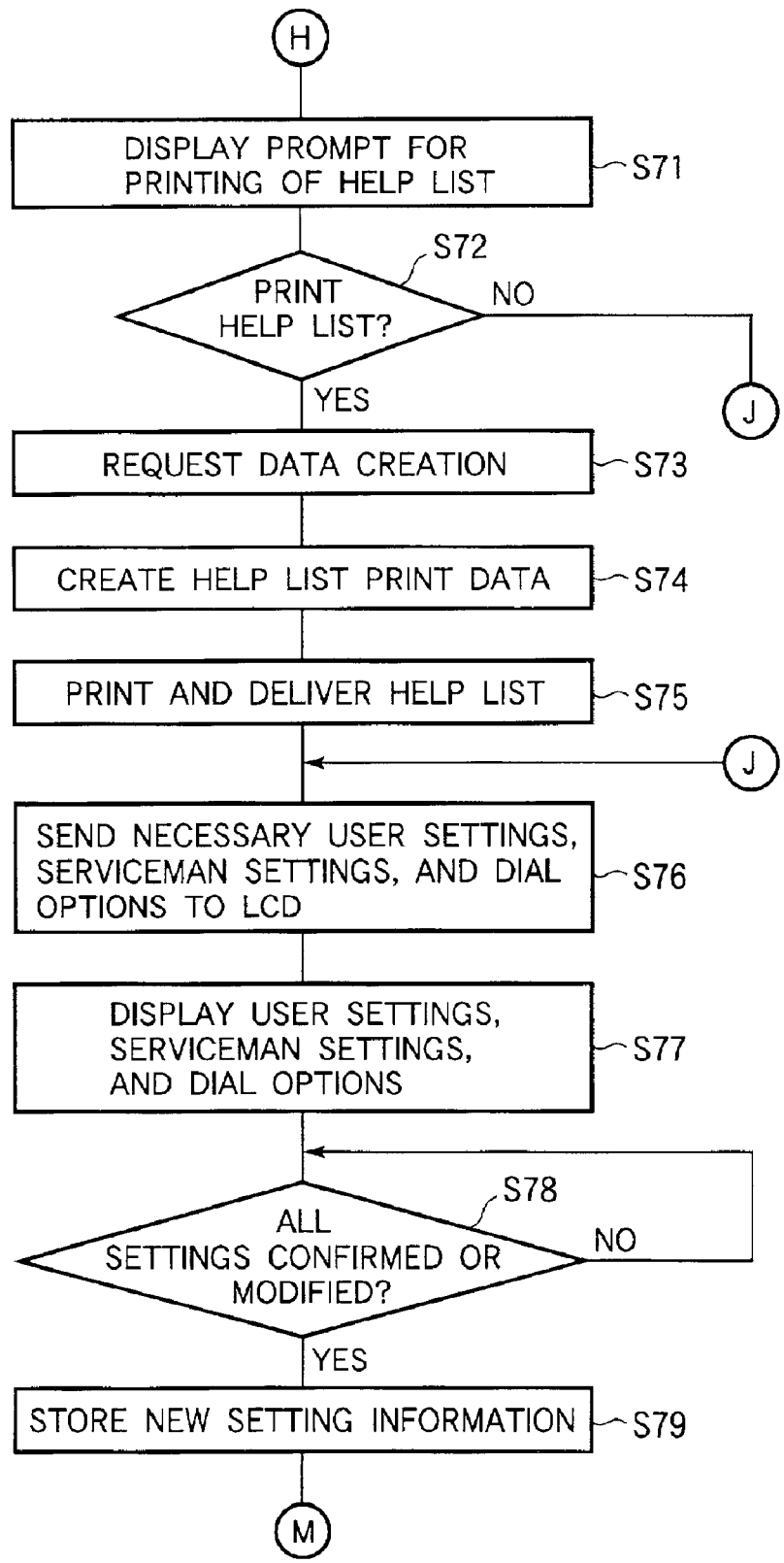
Figure 13C:
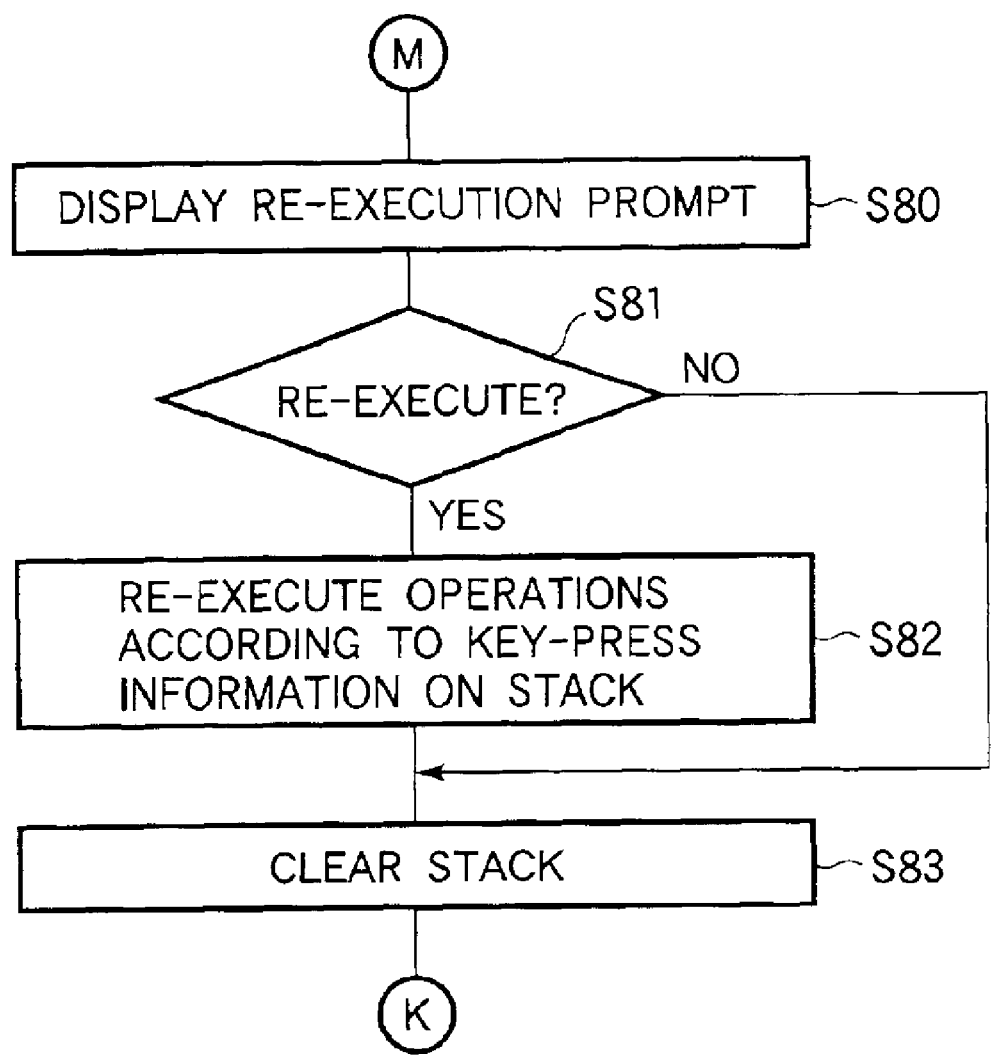

The operation of the above communication terminal device 41 will now be described with reference to FIGS. 9, 11, and 12, and the flowchart shown in FIGS. 13A to 13C.

Once again, the communication terminal device 41 is assumed to remain in the standby mode until the user turns the help function on prior to transmitting data to a distant communication terminal device. The flowchart begins with the LCD 6 displaying the prompt "Turn help function on?" under the control of the operation display control unit 27 (step S61 in FIG. 13A).

After turning the help function on, the user presses a button corresponding to a desired function or service ('transmit' in this example) on the control panel 3, and the operation proceeds from step S61 to step S62. If the user turns the help function off, the operation proceeds from step S61 to step S84 and conventional processing is carried out. In step S62, the user designates the destination by pressing a series of digit keys on the control panel 3, and may designate the resolution and darkness of the document image to be transmitted by pressing further keys on the control panel 3 if necessary (resolution and darkness are not designated in this example). Finally, the user presses the 'Start' button to start transmission.

Key-press information indicating what keys and buttons were pressed, and in what sequence, and a signal indicating that 'transmit' is in the 'on' state with the help function enabled are sent from the control panel 3 to the operation storing unit 24. On reception of this signal and key-press information, the operation storing unit 24 pushes the key-press information onto the stack 28 as shown in FIG. 9 and described in the second embodiment. After that, the control unit 42 executes the function or service according to the key-press information stored on the stack 28. Information about keys and buttons pressed after the execution of the function or service is not stored on the stack 28.

When the operation storing unit 24 determines that the function or service has been executed, if the supervisory unit 53 determines that the function or service was executed without error, or if the only error was a failure to connect with the distant communication terminal device and a connection was established within a preset number of retries (step S63), the supervisory unit 53 sends a signal indicating successful completion of the operation to the operation storing unit 24, the operation storing unit 24 deletes the information stored on the stack 28 (step S64), and the communication terminal device 41 returns to the standby mode (step S65).

If the supervisory unit 53 detects an error, or if a connection with the destination communication terminal device cannot be established the preset number of retries, the operation storing unit 24 decides that execution of the function or service has failed, and the operation proceeds from step S63 to step S66.

In step S66, the control unit 42 determines whether the failure of the data transmission is due to an error for which there is an error code, or whether the transmission failed for some other reason: for example, because it was not possible to establish a connection within the preset number of retries (step S66).

If the failure is due to an error, the supervisory unit 53 sends the corresponding error code to the reference unit 45 (step S67). The reference unit 45 searches the function/service/error code column 55 in the setting table 54 shown in FIG. 12 to find the identical error code, and sends the corresponding setting number or numbers, as listed in the setting numbers column 57, and the address number indicating the storage location in the setting memory 11 of the related help list, as listed in the help list address column 58, to the operation display control unit 27 (step S68). If the cause of the failure is a paper size error, for example, the reference unit 45 receives error code '1234', finds the identical error code '1234' in the function/service/error code column 55, and sends the corresponding setting number 'Y13' and the help list address number '7030' to the operation display control unit 27.

If it was not possible to establish a connection within the preset number of retries, or if the operation failed for some other reason not described by an error code, the reference unit 45 compares the key-press information stored on the stack 28 with the contents of the operation transitions column 56 in the setting table 54 shown in FIG. 12 (step S69). Specifically, the reference unit 45 moves a reference pointer sequentially from the bottom to the top of the stack 28, reads the corresponding key-press information (in this case, digit key information followed by 'Start' button information as shown in FIG. 9), and compares the sequence of key-press information with the contents of the operation transitions column 56 in the setting table 54. The comparison is carried out as described in the second embodiment; that is, the amount of key-press information need not be identical to the amount indicated in the operation transitions column 56, but may vary depending on, for example, whether the user designates the resolution and darkness of the transmitted document image.

When the reference unit 45 finds information in the operation transitions column 56 in the setting table 54 matching the content and sequence of the key-press information on the stack 28, it sends the corresponding setting numbers, which are listed in the setting numbers column 57, and the address number indicating the storage location of the related help list, which is listed in the help list address column 58, to the operation display control unit 27 (step S70). In this example, the key-press information on the stack 28 contains destination digit key-press information followed by the 'Start' key-press information, corresponding to '[ten, OT, AD], start' in the operation transitions column 56, so the reference unit 45 sends the corresponding setting numbers Y5, Y7, Y9, Y5, Y9, D5, D10, S12, S13, S38, and S39 listed in the setting numbers column 57 and the address number '6010' listed in the help list address column 58 to the operation display control unit 27.

Following step S68 or S70, the operation display control unit 27 requests the LCD 6 to display the prompt "Print help list?" The LCD 6 displays the prompt as requested (step S71 in FIG. 13B), and the device waits for the user to answer (step S72).

If the user presses the 'Yes' button on the control panel 3 to request the printing of the applicable help list in step S72, the operation display control unit 27 sends the address number obtained from the help list address column 58, indicating the storage location of the help list, to the print data preparation unit 8, to have print data created for the help list (step S73).

On reception of the address number from the operation display control unit 27, the print data preparation unit 8 reads the help list from the indicated address in the setting memory 11 and creates the print data for the help list (step S74), which are stored temporarily in the printing buffer 9. The printing unit 10 prints and delivers the help list under the control of the control unit 42 (step S75).

The operation display control unit 27 now reads the necessary user settings, serviceman settings, and dial options from the setting memory 11, adds text descriptions, and sends the resulting setting information to the LCD 6 to be displayed (step S76). This step is performed even if the user presses the 'No' button to bypass the printing of the help list in step S72. On reception of the setting information from the operation display control unit 27, the LCD 6 displays the information (step S77).

The user peruses the display on the LCD 6 to check the settings and modifies them as necessary by using the control panel 3. If an error has occurred because the 'sender ID' user setting is 'on', for example, the user sees from the display that this setting is on and can tell from the help list that it should be turned off, and corrects the setting from the control panel 3.

On receiving signals from the control panel 3 indicating that all necessary settings have been checked and modified, the control unit 42 sends the setting values modified by the user to the setting memory 11, in which they are stored (step S79). The operation display control unit 27 now requests the LCD 6 to display the "Re-execute?" prompt. The LCD 6 displays this prompt as requested (step S80 in FIG. 13C), and the device waits for the user to answer the prompt (step S81).

If the user presses the 'Yes' button on the control panel 3 in step S81 to request the re-execution of the function or service that failed (in this example, the 'transmit' function), the operation storing unit 24 passes the information stored on the stack 28, as shown in FIG. 9, in first-in-first-out order to the operation control unit 32; then the operation control unit 32 re-executes the service or function (re-transmits the document, in this example) by causing transitions that retrace the previous state transitions, following the key-press information that has been pulled from the stack 28 by the operation storing unit 24 (step S82). On completion of the re-execution of the transmitting operation, the operation control unit 32 deletes the information stored on the stack 28 (step S83). Step S83 is also performed if the user presses the 'No' button to bypass re-execution of the function or service that failed to be executed correctly.

The third embodiment provides all of the effects provided by the second embodiment, without requiring the user to indicate whether a function or service has been executed correctly. Because of the supervisory unit 53, the communication terminal device 41 can make this determination automatically. Accordingly, when no failure occurs, no user intervention is required. For that reason, the third embodiment provides a communication terminal device 41 that is more convenient to use than the communication terminal devices in the preceding embodiments.

In these three embodiments, the device described was a communication device with a copy function, but the invention is also applicable to other devices that require multiple settings, such as printers, and devices offering various combinations of printing, scanning, copying, and communication functions.

Those skilled in the art will recognize that further variations are possible within the scope claimed below.

What is claimed is:

1. A device that carries out a plurality of functions or services according to a plurality of settings, and has a help function, comprising:

a first memory storing addresses of a plurality of help lists, each help list corresponding to some service or function among said services or functions, the help list indicating correct setting information applicable when the service or function is executed;

a second memory storing the help lists at the addresses given in the first memory;

a reference unit for using information related to unexecuted operations to find an address, in the first memory, of a help list applicable to one of the functions or services that was being attempted when the device failed to operate correctly; and a memory reading unit for reading the help list from the second memory at the address found by the reference unit.

2. The device of claim 1, further comprising:
a first display unit for displaying a prompt to alter at least one setting among said settings when the memory reading unit reads said help list.

3. The device of claim 2, further comprising a second display unit for displaying the help list read by the memory reading unit.

4. The device of claim 3, wherein the second display unit prints the help list read by the memory reading unit.

5. A device that carries out a plurality of functions or services according to a plurality of settings, and has a help function, comprising:
a first memory storing addresses of a plurality of help lists, each help list corresponding to some service or function among said services or functions, the help list indicating correct setting information applicable when the service or function is executed;
a second memory storing the help lists at the addresses given in the first memory;
a reference unit for determining which function or service was being attempted when the device failed to operate correctly, and finding an address, in the first memory, of a help list applicable to said function or service that was being attempted when the device failed to operate correctly; and
a memory reading unit for reading the help list from the second memory at the address found by the reference unit.

6. The device of claim 5, further comprising:
an input unit for input of information by a user; and
a modifying unit for modifying said settings according to the information input by the user, thereby changing said settings to settings that will make the device operate normally.

7. The device of claim 5, further comprising a display unit for displaying the help list read by the memory reading unit.

8. The device of claim 7, wherein the display unit prints the help list read by the memory reading unit.

9. A device that carries out a plurality of functions or services according to a plurality of settings, and has a help function, comprising:
a setting memory storing the settings used when each one of said functions or services is performed;
a reference unit storing a table relating the setting in the setting memory to the functions or services in which the settings are used;
a searching unit for determining which function or service was being attempted when the device failed to operate correctly, referring to the table in the reference unit, and finding the settings, in the setting memory, corresponding to said function or service that was being attempted when the device failed to operate correctly; and
a prompting unit for prompting a modification of the settings found by the searching unit.

10. The device of claim 9, further comprising:
an input unit for input of information by a user; and
a modifying unit for modifying said settings according to the information input by the user, thereby changing said settings to settings that will make the device operate normally.

11. A device that carries out a plurality of functions or services according to a plurality of settings, and has a help function, comprising:
an input unit through which a user inputs information needed for operating the device;
a cumulative memory for storing the information input through the input unit, in order of input;
a first memory storing addresses of a plurality of help lists, each help list corresponding to a transition of operations of one of said services or functions, the help list indicating correct setting information applicable when the service or function is executed;
a second memory storing the help lists at the addresses given in the first memory;
a reference unit for determining a transition of operations of a function or service that was being attempted when the device failed to operate correctly, and finding an address, in the first memory, of a help list applicable to said function or service that was being attempted when the device failed to operate correctly; and
a memory reading unit for reading the help list from the second memory at the address found by the reference unit.

12. The device of claim 11, further comprising:
a modifying unit for modifying said settings according to the information input by the user, thereby changing said settings to settings that will make the device operate normally.

13. The device of claim 12, further comprising:
an operation control unit for operating the device again according to the information stored in the cumulative memory after the settings have been modified by the modifying unit.

14. The device of claim 11, further comprising a display unit for displaying the help list read by the memory reading unit.

15. The device of claim 14, wherein the display unit prints the help list read by the memory reading unit.

16. A device that carries out a plurality of functions or services according to a plurality of settings, and has a help function, comprising:
an input unit through which a user inputs information needed for operating the device;
a supervisory unit for outputting an error code when the device fails to operate correctly, the error code indicating the reason why the device failed to operate correctly;
a first memory storing addresses of a plurality of help lists, each help list corresponding to one of said services or functions or to one said error code, the help list indicating correct setting information applicable when the service or function is executed;
a second memory storing the help lists at the addresses given in the first memory;
a reference unit for receiving the error code output by the supervisory unit and finding an address, in the first memory, of a help list corresponding to the error code; and
a memory reading unit for reading the help list from the second memory at the address found by the reference unit.

17. The device of claim 16, further comprising:
a modifying unit for modifying said settings according to the information input by the user, thereby changing said settings to settings that will make the device operate normally.

18. The device of claim 16, further comprising a display unit for displaying the help list read by the memory reading unit.

19. The device of claim 18, wherein the display unit prints the help list read by the memory reading unit.

* * * * *